3,138,453
TUNGSTEN ELECTRODES

Ellis L. Foster, Jr., Powell, and Ray R. Walker, Columbus, Ohio, assignors to the United States of America as represented by the United States Atomic Energy Commission
No Drawing. Filed Mar. 13, 1962, Ser. No. 179,493
5 Claims. (Cl. 75—65)

This invention deals with improved tungsten-base electrodes as they are used for the arc-melting of refractory metals, such as tantalum, zirconium, molybdenum, and alloys containing these metals in predominant quantities. The invention also deals with processes of arc-melting and arc-welding the refractory metals while using the electrode of this invention.

Refractory metals and alloys as they just have been listed are used frequently as the construction material of nuclear reactors in which a molten plutonium alloy is cycled as the fuel; they also often serve as the cladding material for uranium metal fuel elements.

Refractory alloys have been produced heretofore by arc-melting processes using a tungsten electrode and an inert atmosphere. However, these processes have shown the drawback that the electrode was eroded unduly fast, which, in turn, resulted in a contamination of the metal to be melted or welded with tungsten metal.

It is an object of this invention to provide a tungsten electrode that shows a minimum or erosion when in use.

It is also an object of this invention to provide a process of arc-melting refractory metals with a tungsten electrode whereby contamination of the metal with tungsten is negligibly low.

It has been found that erosion of the electrode and consequently the contamination of the metal by tungsten are considerably reduced if the tungsten electrode contains a small amount of yttrium metal. It is believed that this beneficial effect is due to an increased electron emission at elevated temperatures.

The incorporation of yttrium into the tungsten electrode material can be accomplished in various ways. For instance, it can be effected by striking an arc between the tungsten electrode and yttrium metal. In this case, only the surface is conditioned by yttrium for reduced erosion, and the conditioning process has to be repeated before each use of the electrode. Surface-incorporation of the electrode on a temporary basis can also be accomplished by spattering or coating the electrode with molten yttrium metal. A permanent conditioning of the electrode can be brought about by alloying the yttrium with the tungsten or by combining the two metals by powder metallurgy, that is, by mixing tungsten and yttrium powders, compacting the mixture and sintering it into the shape desired.

One method frequently used in arc-melting refractory metals by the process of this invention comprised superimposing a layer of yttrium metal on the refractory metal to be treated and establishing an arc between the tungsten electrode and the hearth holding the layers of refractory metal and yttrium metal. The yttrium metal thereby coats the tungsten electrode, and the refractory metal is heated and melted.

Only a very small quantity of yttrium has to be incorporated in order to obtain the effect desired. A quantity of 0.2% by weight was found to be more than is necessary to eliminate loss by erosion. The preferred quantity was found to be 0.1% by weight.

As has been mentioned, the electrode is preferably used in an inert atmosphere.

As mentioned, the electrode of this invention is used for arc-melting and welding refractory metals; it is particularly well suitable for melting in cold-mold and skull-type arc-melting furnaces either in an inert atmosphere or under a dynamic vacuum. The reduced electrode consumption makes the use of longer outgassing times possible, which in turn results in a higher-purity metal. The new electrode also finds utility in plasma jet systems, because also there it has a longer service life than the conventional untreated tungsten electrode.

In the following, an example is given for illustrative purposes.

Example

Two parallel experiments were carried out, in both of which tantalum metal was melted by an arc-melting process using an atmosphere of helium ⅓ atm. abs. and a tungsten electrode. Both experiments were carried out under identical conditions with the exception that for run No. 1 a conventional tungsten electrode was used, while that for run No. 2 was yttrium-conditioned according to this invention; the yttrium had been applied as a coating by arc-melting a charge of yttrium metal with the tungsten electrode previous to arc-melting the tantalum metal.

While after the melting procedure the tip of the electrode of run No. 1 was heavily corroded, the yttrium-conditioned electrode used for run No. 2 showed no substantial surface change.

The tantalum metals of both runs, after solidification, were analyzed for their tungsten content. The tantalum obtained in the first run contained 1.0 weight percent of tungsten, while that of the second run showed a tungsten content of about 100 p.p.m. These results clearly show the beneficial effect of yttrium.

It will be understood that the invention is not to be limited to the details given herein but that it may be modified within the scope of the appended claims.

What is claimed is:

1. A process of reducing the erodibility of a tungsten electrode during use for arc-melting consisting of striking an arc between yttrium metal and the tungsten electrode, whereby yttrium melts and coats said electrode.

2. A process of arc-melting refractory metals selected from the group consisting of tantalum, zirconium, molybdenum and alloys containing these metals in predominant quantities in an inert atmosphere, comprising charging the refractory metal into a hearth; superimposing a layer of elementary yttrium metal on the refractory metal to be treated; and establishing an arc between a tungsten electrode and the hearth holding the layers of refractory metal and yttrium, whereby the yttrium metal melts and coats the tungsten electrode, and the refractory metal is heated and melted.

3. An electrode for arc-melting refractory metals in an inert atmosphere, said electrode consisting of tungsten containing a small amount of elementary yttrium metal sufficient to increase the emissivity of the electrode and thereby to reduce erosion of the electrode.

4. The electrode of claim 3 wherein the yttrium content is approximately 0.1% by weight of the tungsten.

5. The electrode of claim 4 wherein the yttrium is homogeneously dispersed throughout the entire electrode.

References Cited in the file of this patent
UNITED STATES PATENTS

| | | |
|---|---|---|
| 2,694,764 | Muller | Nov. 16, 1954 |
| 2,825,703 | Conant | Mar. 4, 1958 |
| 2,977,225 | Wlodek et al. | Mar. 28, 1961 |